United States Patent
Fisher et al.

(10) Patent No.: US 8,362,649 B2
(45) Date of Patent: Jan. 29, 2013

(54) MULTI-USE VOLTAGE REGULATOR

(75) Inventors: David Fisher, Menlo Park, CA (US); Ravi Ramachandran, San Jose, CA (US)

(73) Assignee: R2 Semiconductor, Inc., Sunnyvale, CA (US)

( * ) Notice: Subject to any disclaimer, the term of this patent is extended or adjusted under 35 U.S.C. 154(b) by 336 days.

(21) Appl. No.: 12/818,265

(22) Filed: Jun. 18, 2010

(65) Prior Publication Data
US 2011/0309679 A1 Dec. 22, 2011

(51) Int. Cl.
*H02J 1/00* (2006.01)
*H02J 3/00* (2006.01)

(52) U.S. Cl. .......... 307/86; 330/123; 330/127; 330/196; 330/297

(58) Field of Classification Search .................... 307/86; 330/297, 123, 127, 199
See application file for complete search history.

(56) References Cited

U.S. PATENT DOCUMENTS

| | | | |
|---|---|---|---|
| 4,320,350 A | 3/1982 | Drapac | |
| 4,442,407 A | 4/1984 | Apel | |
| 5,251,331 A | 10/1993 | Schwent et al. | |
| 5,661,434 A | 8/1997 | Brozovich et al. | |
| 6,060,949 A | 5/2000 | Kaufman et al. | |
| 6,069,526 A | 5/2000 | Ballantyne | |
| 6,148,220 A | 11/2000 | Sharp et al. | |
| 6,208,202 B1 | 3/2001 | Kaufman et al. | |
| 6,271,722 B1 | 8/2001 | Ballantyne | |
| 6,445,247 B1 | 9/2002 | Walker | |
| 6,633,750 B1 | 10/2003 | Dacus et al. | |
| 6,646,511 B2 * | 11/2003 | Canyon et al. | 330/297 |
| 6,757,526 B1 | 6/2004 | Sharp et al. | |
| 6,774,508 B2 | 8/2004 | Ballantyne et al. | |
| 6,806,768 B2 | 10/2004 | Persico et al. | |
| 7,132,891 B1 | 11/2006 | Dening et al. | |
| 8,160,520 B2 * | 4/2012 | Srinivasan et al. | 455/127.3 |
| 2004/0075494 A1 | 4/2004 | Klomsdorf et al. | |
| 2004/0207468 A1 | 10/2004 | Klomsdorf et al. | |
| 2007/0103233 A1 | 5/2007 | Lee | |
| 2010/0033014 A1 * | 2/2010 | Mueller | 307/31 |

OTHER PUBLICATIONS

"Improving the Power-Added Efficiency of FET Amplifiers Operating with Varying-Envelope Signals", A. Saleh and D. Cox, IEEE Transactions on Microwave Theory and Techniques, vol. 31, p. 51 (1983).

"High Efficiency CDMA RF Power Amplifier Using Dynamic Envelope Tracking Technique", J. Staudinger, B. Gilsdorf, D. Newman, G. Norris, G. Sadowniczak, R. Sherman, and T. Quach, 2000 IEEE MTT-S International Microwave Symposium, vol. 2, p. 873.

(Continued)

*Primary Examiner* — Rexford Barnie
*Assistant Examiner* — Toan Vu
(74) *Attorney, Agent, or Firm* — Brian R. Short

(57) ABSTRACT

Embodiments for at least one method and apparatus of a multi-use voltage regulator providing a supply voltage to a power amplifier and at least one other device are disclosed. One method includes generating a plurality of regulated voltage supplies from an unregulated voltage. An output signal power level of the power amplifier is determined. A one of the regulated plurality of voltage supplies and the unregulated voltage supply is selected as a power amplifier voltage supply for the power amplifier based at least in part on the output signal power level of the power amplifier. If the selected power amplifier voltage supply is one of the plurality of regulated voltage supplies, then the selected one of the plurality of regulated voltage supplies is simultaneously provided to the power amplifier and the at least one other device.

20 Claims, 11 Drawing Sheets

OTHER PUBLICATIONS

"High-efficiency power amplifier using dynamic power-supply voltage for CDMA applications", G. Hanington, P. Chen, P. Asbeck, and L. Larson, IEEE Transactions on Microwave Theory and Techniques, vol. 47, p. 1471 (1999).

"Synergistic Design of DSP and Power Amplifiers for Wireless Communications" P. Asbeck, L. Larson and I. Galton, IEEE Trans Microwave Theory & Techniques MTT-49 #11 p. 2163 (2001).

"Increasing the Talk Time of Mobile Radios with Efficient Linear Transmitter Architectures", S. Mann, M. Beach, P. Warr and J. McGeehan, Electronics & Communication Engineering Journal, Apr. 2001, p. 65.

3G Wireless Networks (2nd Edition), C. Smith and D. Collins, McGraw-Hill 2007.

"FAN5902 Power Management Solution for Improving the Power Efficiency of 3G WCDMA RF Power Amplifiers", AN-6088, Fairchild Semiconductor Corporation.

"System-Level Requirements of DC-DC Converters for Dynamic Power Supplies of Power Amplifiers", B. Sahu, G. Rincon-Mora, APASIC 2002.

"Integrated DC-DC Converter Design for Improved WCDMA Power Amplifier Efficiency in SiGe BiCMOS Technology", D. Guckenberger and K. Kornegay, ISLPED 2003, p. 449.

"Analogue Dynamic Supply Voltage L-band GaN High Power Amplifier with Improvement of Efficiency and Linearity", Matsunaga, Tanomura, Nakayama, Ando, Miyamoto, Shimawaki, 2007 IEEE, pp. 1107-1111.

PCT; Notification of Transmittal of the International Search Report and the Written Opinion of the International Searching Authority, of the Declaration; Feb. 17, 2012.

\* cited by examiner

MULTI-USE VOLTAGE REGULATOR

RELATED APPLICATIONS

This patent application is related to patent application Ser. No. 12/818,087, titled "Operating a Voltage Regulator at a Switching Frequency Selected to Reduce Spurious Signals", filed on Jun. 17, 2010 which is herein incorporated by reference.

FIELD OF THE DESCRIBED EMBODIMENTS

The described embodiments relate generally to power conversion. More particularly, the described embodiments relate to method and apparatus for multi-use voltage regulation.

BACKGROUND

The output power amplifier of a cellular telephone handset or mobile data device consumes a substantial amount of power when voice or data are being transmitted. In most cellular telephony protocols, the transmitted power at the mobile station is intentionally varied; for example, when a code-division-multiple-access (CDMA) protocol is employed, the transmitted power for each mobile is adjusted to ensure that the received power from each mobile at the basestation is approximately constant. As a result of transmit power control, mobile stations typically transmit at much lower than the maximum power level they can attain. For example, in a conventional CDMA system, the mobile station may be capable of transmitting up to 1 watt (30 dBm) of RF output power, but will most often transmit at a power level of 3 to 10 milliwatts, as depicted in FIG. 1.

In order to ensure good linearity during operation, mobile station power amplifiers operate in class A or class AB mode, where substantial power is consumed due to the bias current irrespective of the signal power transmitted. In this case, it is wasteful to employ a high supply voltage when only a low-power signal needs to be sent. To minimize the DC power required for the AC power to be transmitted, some implementations include intentionally varying the DC supply voltage or the DC current provide to the power amplifier. The supply voltage may be varied to follow the "instantaneous" envelope of the transmitted signal, or from one packet to the next based on the nominal power of the packet. or less frequently based on the current average transmit power requested from the Power Amplifier.

However, the described schemes have several disadvantages. Specialized DC-DC converters are required, along with complex control circuitry to match the instantaneous supplied voltage with the output power required. Even in the case where only slow voltage adaptation is attempted, a dedicated variable-output-voltage DC-DC converter is required for the power amplifier, incurring added cost. It is therefore desirable to have a lower-cost means of improving system efficiency.

SUMMARY

An embodiment includes a method of a multi-use voltage regulator providing a supply voltage to a power amplifier and at least one other device. The method includes generating a plurality of regulated voltage supplies from an unregulated voltage. An output signal power level of the power amplifier is determined. A one of the regulated plurality of voltage supplies and the unregulated voltage supply is selected as a power amplifier voltage supply for the power amplifier based at least in part on the output signal power level of the power amplifier. If the selected power amplifier voltage supply is one of the plurality of regulated voltage supplies, then the selected one of the plurality of regulated voltage supplies is simultaneously provided to the power amplifier and the at least one other device.

Another embodiment includes a multi-use voltage regulator system. The multi-use voltage regulator system includes at least one regulated power supply, wherein each regulated power supply receives an unregulated voltage and produces a regulated voltage. A representation of an output signal power level of a power amplifier is used for selecting a power amplifier supply voltage from a one of the unregulated voltage and the at least one regulated voltage. If the selected power amplifier voltage supply is one of the plurality of regulated voltage supplies, then the selected one of the plurality of regulated voltage supplies is simultaneously provided to the power amplifier and the at least one other device.

Other aspects and advantages of the described embodiments will become apparent from the following detailed description, taken in conjunction with the accompanying drawings, illustrating by way of example the principles of the described embodiments.

DETAILED DESCRIPTION

The described embodiments enable the use of existing system voltages within a mobile handset or data device to supply required power for the operation of digital logic circuitry and other circuitry within the handset, and to provide alternative reduced-voltage power for an output power amplifier or amplifiers in the device. For the described embodiments, the efficiency of the power amplifier is greatly increased, with minimal changes in the complexity, cost, and size of the mobile device.

Mobile or portable devices, such as cellular telephone handsets, personal digital assistants, smart phones, and other battery-powered wireless devices, typically contain a battery, a transceiver, a digital baseband section, and a power amplifier, in addition to other functions such as a system CPU, transducers, user interfaces, and other system components. These differing components require different voltages for their operation. For example, the transceiver is a mixed-signal component which performs several key functions relevant to the transmission and reception of radio signals. These functions include the creation of a carrier signal using a local oscillator and frequency synthesizer, the modulation of that signal through e.g. digital-to-analog conversion and upconversion of a baseband transmitted signal, amplification and downconversion of a received RF signal, filtering and selection of the wanted signal in the presence of other interfering signals, and digitization of the resulting baseband signal. These essentially-analog functions may require a supply voltage of 1.8 to 2.5 volts. In contradistinction, the digital baseband processor, which is responsible for such functions as the creation of properly-formed data packets, interpretation of received data, management of media access control (MAC) and link state, and interaction with higher-level networking entities, is a purely digital circuit. Thus, the digital baseband processor may require a supply voltage of 1.8 volts, 1.2 volts, 1.1 volts, or less. Optionally, the portable device may include other digital circuitry requiring low voltages but possibly high peak currents, and other mixed-signal or analog circuits, such as those driving transducers, speakers, microphones, and displays, that require higher-voltage supplies. Therefore, most such devices contain two or more voltage regulators, delivering various regulated supply voltages of differing values, in addition to the battery itself.

Figure 1:
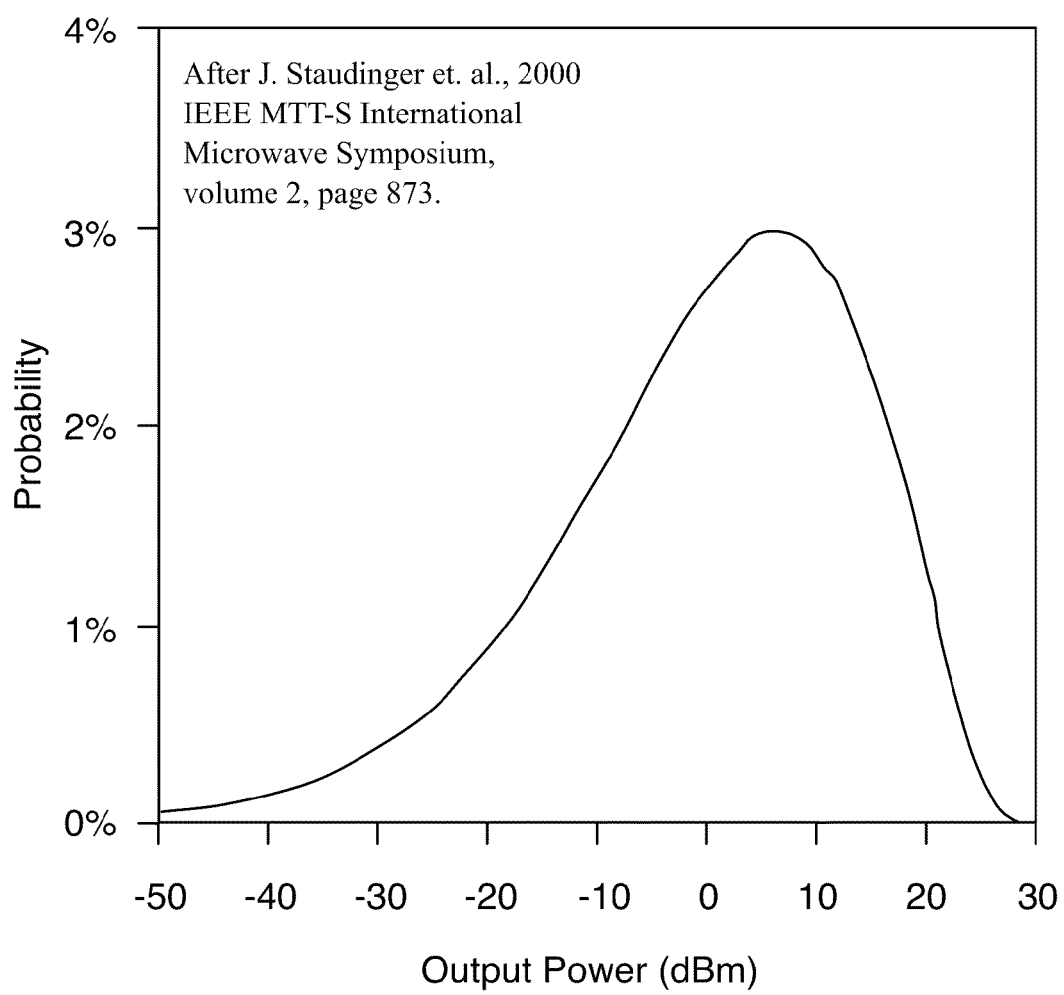
FIG. 1 shows an example of a typical distribution of output power of a mobile station.
Figure 2:
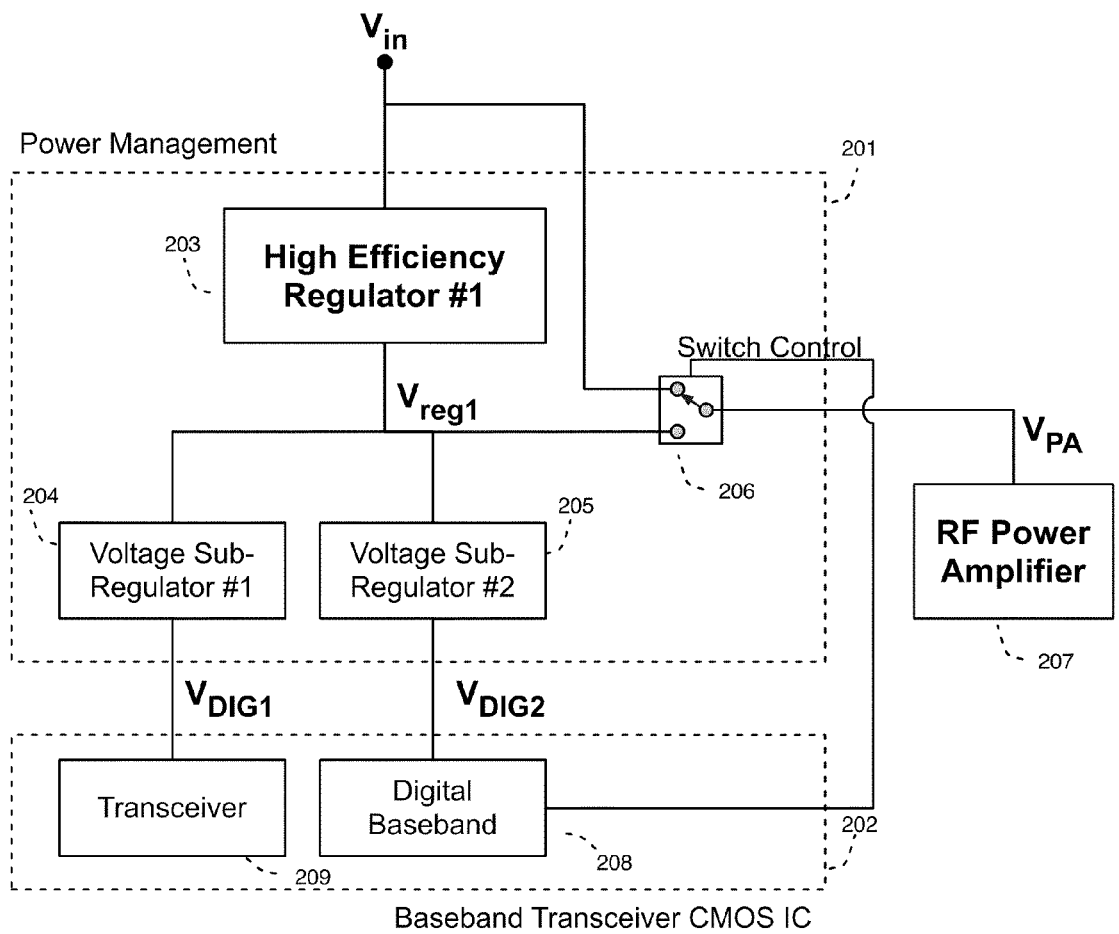
FIG. 2 is a block diagram that shows an example of multi-use voltage regulation within a mobile transceiver.

FIG. 2 is a block diagram that shows an example of multi-use voltage regulation 201 within, for example, a mobile transceiver. A battery or other source supplies an unregulated voltage $V_{in}$, whose nominal value might for example be equal to 3.6 V in the case where a lithium AA battery is employed. A high-efficiency regulator 203, typically a switching regulator converts $V_{in}$ to a regulated output voltage $V_{reg1}$, typically of reduced value relative to $V_{in}$. One or more additional sub-regulators, such as 204 and 205, are used to provide differing voltage values for different system components; in this exemplary embodiment, the sub-regulators are used for the transceiver 209 and digital baseband circuitry 208, in general producing different voltage outputs $V_{DIG1}$ and $V_{DIG2}$. The sub-regulators may be high-efficiency switching regulators, or may be simple linear regulators, depending on the requirements of a given application. It is important to note that all these cited components are required for system operation even in the absence of the power amplifier, and thus the cost, size, and power consumption incurred by those components may be regarded as sunk costs. A significant net benefit may thus be obtained by putting them to additional use, in most cases considerably exceeding the additional cost of any increase in current-carrying capacity required to supply the RF Power Amplifier 207 in addition to the other digital or analog circuitry.

For an embodiment, the RF Power Amplifier input DC supply $V_{PA}$ is connected to a single-pole double-throw switch 206, such that the power amplifier 207 may be powered directly from the voltage supply, or alternatively from the output $V_{REG1}$ of High Efficiency Regulator #1, 203. The state of the switch 206 is chosen prior to each transmission based on the intended output RF power. The rate at which the switch state is updated is preferably the same as the rate at which the nominal output power of the RF Power Amplifier is updated. For example, in a wideband WCDMA cellular wireless system, mobile stations receive instructions on transmit power adjustment 1500 times per second. In such a system, a test of the switch state may be performed each time a new power control update is received.

Figure 3:
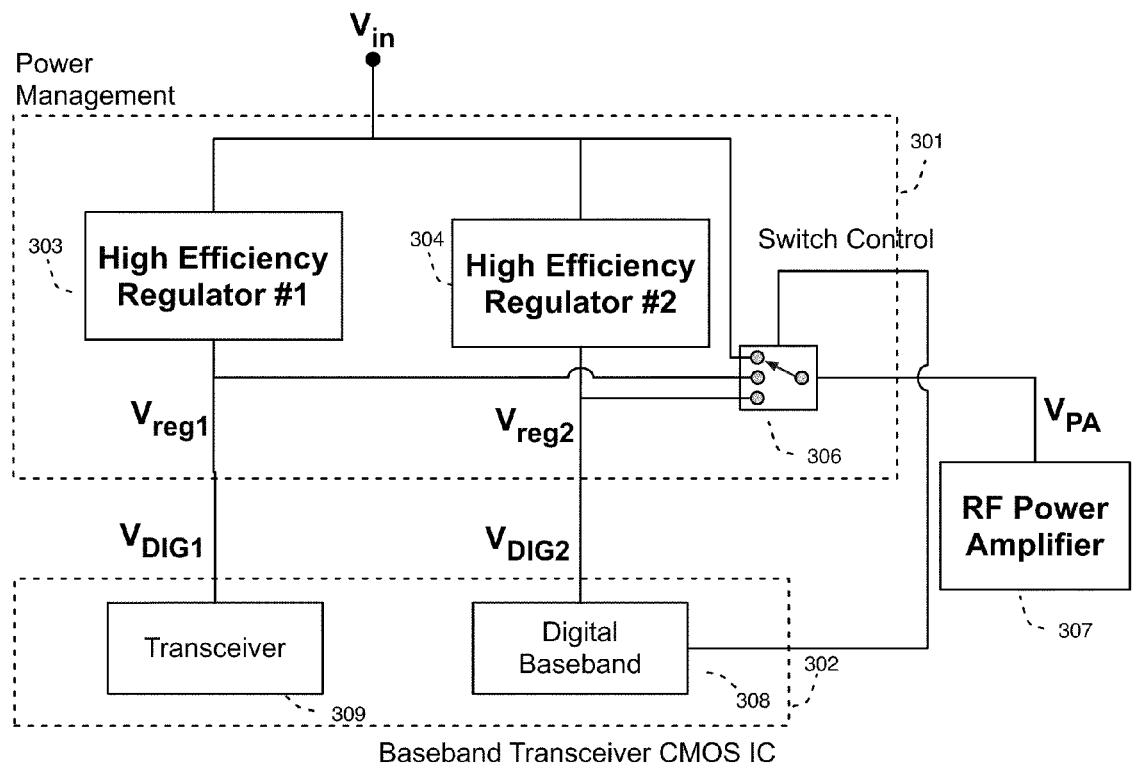
FIG. 3 is a block diagram that shows an example of multi-use voltage regulation within a mobile transceiver that includes a selection of multiple regulated voltage supplies.

In an alternative embodiment, a switch with additional positions may be employed to take advantage of additional high-efficiency regulated power supply voltages available in a given system design. FIG. 3 is a block diagram that shows an example of multi-use voltage regulation 301 within a mobile transceiver that includes a selection of multiple regulated voltage supplies. This embodiment includes a single-pole triple-throw switch 306. Note that both regulators 303, 304 are High Efficiency Regulators. Linear regulators may be employed in a system design, as noted previously, but it is not advantageous to use the output of a linear regulator as the input of the RF Power Amplifier, because linear regulators are dissipative devices. Additional current required by the Power Amplifier induces additional resistive dissipation in a linear regulator, and therefore no net benefit in system efficiency is obtained.

As shown, the single-pole triple-throw switch 306 provides the voltage supply to the Power Amplifier 307. The regulator 303 provides a voltage supply to the transceiver 309 and the regulator 304 provides a voltage supply to the digital baseband 308 of the baseband transceiver 302.

The availability of additional supply voltages allows more flexible adaptation to the intended output power, and thus improves device power efficiency. The only substantial expense incurred is the addition of the switch 306, since High Efficiency Regulators #1, #2 (303, 304), and so on, are already present as part of the overall system design, and typically modest changes in current and power ratings are needed. Update frequency considerations are identical to those discussed above in connection with a double-throw switch.

As previously shown and described, the High Efficiency Regulators #1, #2 (303, 304), can be used to provide differing voltage values for different system components; in this exemplary embodiment, the regulators can be used for the transceiver 309 and digital baseband circuitry 308, in general producing different voltage outputs $V_{DIG1}$ and $V_{DIG2}$.

Figure 4:
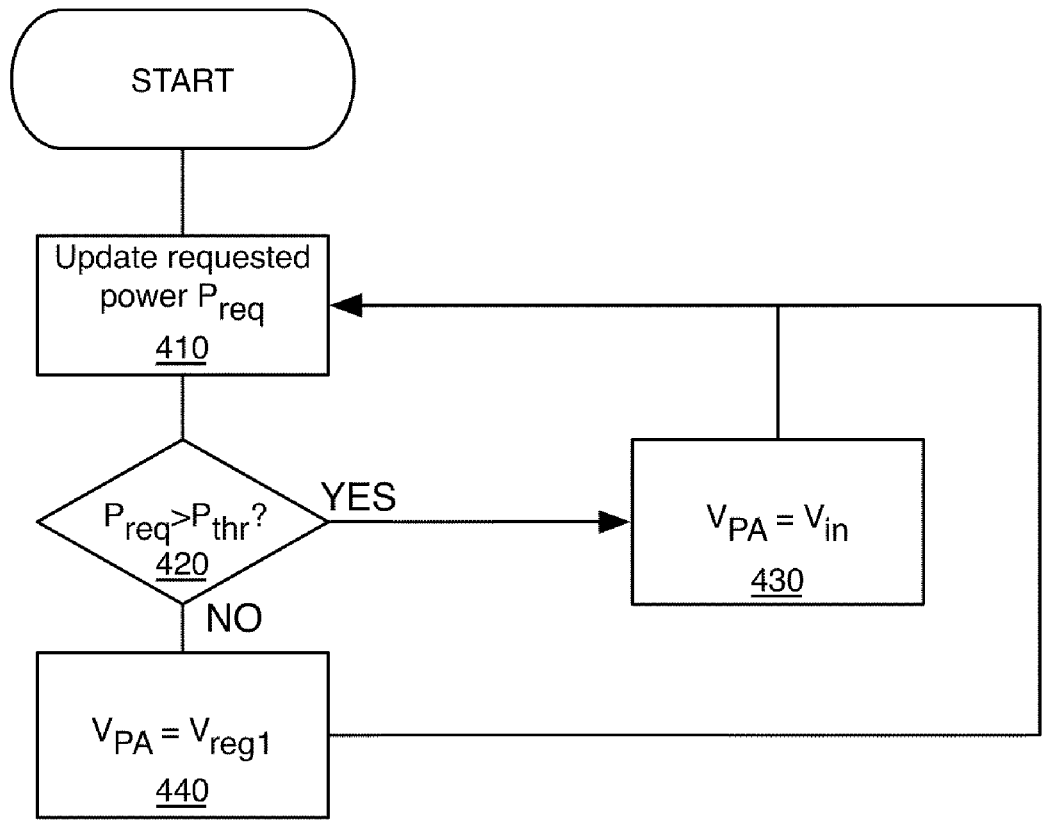
FIG. 4 is a flow chart that includes steps of an example of a method of determining a state of a double-throw switch within a multi-use voltage regulator.

FIG. 4 is a flow chart that includes steps of an example of a method of determining a state of a double-throw switch (such as, double-throw switch 206). This flow presumes that a periodic update (step 410) to the requested output power from the amplifier is available. Each time the requested power is updated, the requested value is examined (step 420) to determine whether it exceeds a predetermined threshold value $P_{thr}$; as long as the requested power is greater than the threshold (step 430), the switch state is set to provide the supply voltage $V_{in}$ to the power amplifier. If the requested power is less than or equal to the threshold power (step 440), the switch state is set to provide the lower regulated value $V_{reg1}$ to the power amplifier.

Figure 5:
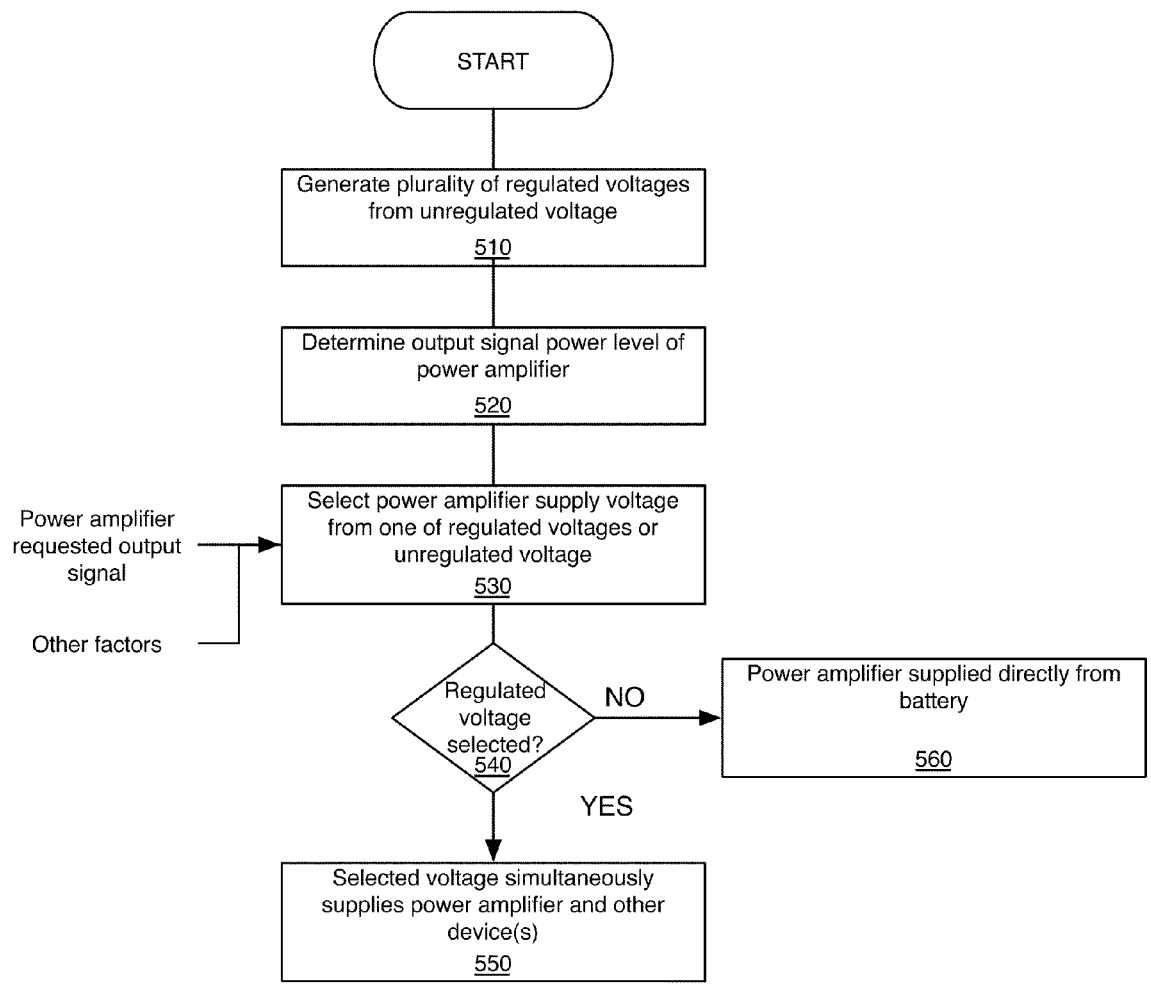
FIG. 5 is a flow chart that includes steps of an example of a method of a multi-use voltage regulator providing a supply voltage to a power amplifier and at least one other device.

FIG. 5 is a flow chart that includes steps of an example of a method of a multi-use voltage regulator providing a supply voltage to a power amplifier and at least one other device. A first step 510 includes generating a plurality of regulated voltage supplies from an unregulated voltage. A second step 520 includes determining an output signal power level of the power amplifier. A third step 530 includes selecting a one of the regulated plurality of voltage supplies and the unregulated voltage supply as a power amplifier voltage supply for the power amplifier based at least in part on the output signal power level of the power amplifier, wherein if the selected power amplifier voltage supply is one of the plurality of regulated voltage supplies, then simultaneously providing the selected one of the plurality of regulated voltage supplies to the power amplifier and the at least one other device. Once selected (step 540) the power amplifier is connected to the unregulated voltage supply (for example, a battery) (step 560), or the power amplifier is connected to one of a plurality of regulated voltages along with at least one other device (step 550).

An embodiment includes determining if the output signal power level is greater than a predetermined threshold. If the output signal power level is greater than the predetermined threshold, then a first voltage supply of the plurality of regulated voltages and the unregulated voltage supply is selected, else, another of the plurality of regulated voltage supplies is selected.

For an embodiment, the power amplifier voltage supply is selected at a rate at least as great as a rate in which the determined output signal power level changes more than a threshold. For another embodiment, the power amplifier voltage supply is reselected each time the determined output signal power level crosses a predetermined threshold.

For an embodiment at least one of the plurality of regulated voltage supplies includes a switching regulator, and a switching frequency of the switching regulator is selected to avoid generation of interfering signals within a pass-band of the power amplifier and associated transmit band filter. For a more specific embodiment, at least one of the plurality regulated voltage supplies includes a switching regulator, the power amplifier amplifies transmission signals of a transmit channel of a transceiver, and a switching frequency of the switching regulator is selected to avoid generation of interfering signals within a paired receive channel. The transceiver can include a transmit channel and a paired receive channel which can include the same or different ranges of frequencies that interfering signals generated due to the switching regulator should avoid.

Figure 10:
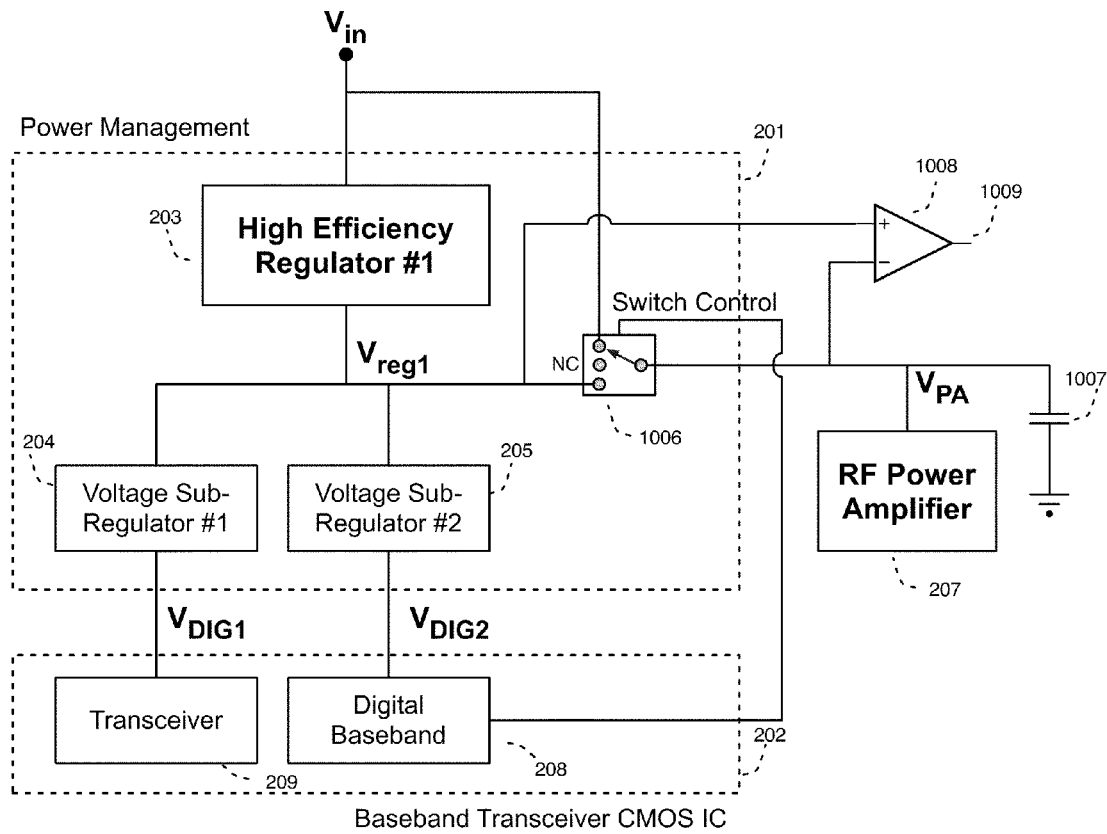
FIG. 10 is a block diagram that shows an example of multi-use voltage regulation within a mobile transceiver that includes a selection of multiple voltage supplies and an open switch setting for providing a switching time delay.
Figure 11:
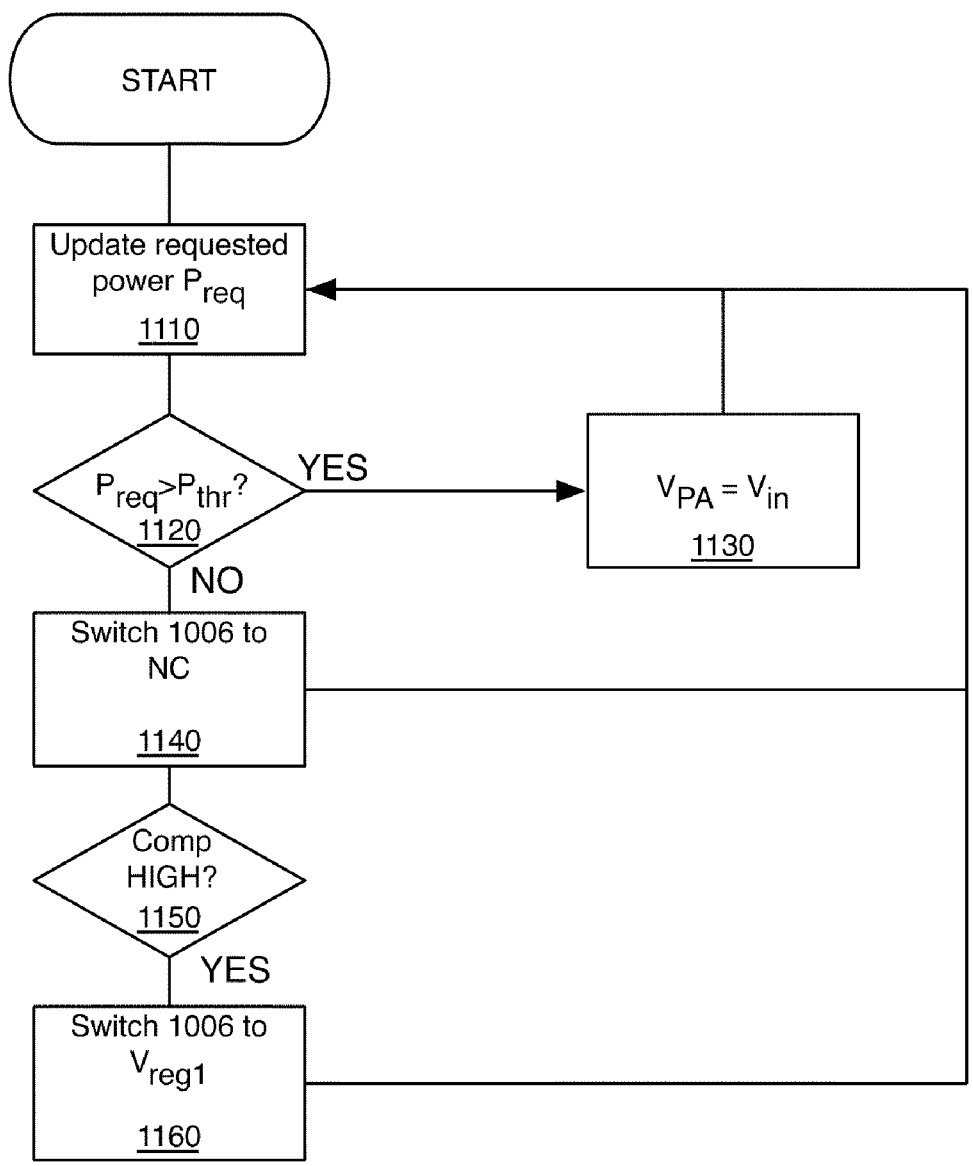
FIG. 11 is a flow chart that shows steps of an example of a method of determining a current state of a triple-throw switch of a multi-use voltage regulator that includes a switching time delay.

As will be shown and described in FIGS. 10 and 11, an embodiment includes determining a switch time delay if a new voltage supply is selected that has a lower voltage potential than a previously selected voltage supply, wherein the switch time delay influences how long it takes to switch from providing the power amplifier with the previously selected power supply to providing the power amplifier with the new voltage supply. For one embodiment, the switch delay time is determined by a value of a decoupling capacitor and a value of a load current of the power amplifier. For another embodiment, the switch delay time is determined by a comparator that senses when a supply voltage potential of the power amplifier decays to within a margin of a voltage potential of the new voltage supply.

An embodiment includes the power amplifier voltage supply being selected by referencing a predetermined look-up-table that provides the power supply selection based on the determined output signal power level. A more specific embodiment includes the look-up-table being predetermined by characterizing the power amplifier for efficiency with compliant linearity over possible output signal power levels. Additionally, the look-up-table can be selected from a plurality of possible look-up-tables. For another embodiment, the look-up-table is selected from the plurality of possible look-up-tables depending upon operating conditions of the power amplifier.

For an embodiment, the look-up-table is selected from the plurality of possible look-up-tables depending upon a type of communication signal being amplified by the power amplifier. The type of communication signal can include, for example, LTE (Long Term Evolution), WiMAX (Worldwide Interoperability for Microwave Access) or WCDMA (Wideband Code Division Multiple Access), or even QAM or 16-QAM. The different types of communication signals can include different peak to average power ratios, which influences the power thresholds for the voltages supplied to the power amplifier.

For an embodiment, the power amplifier voltage supply is adaptively selected by sensing a bias current of the power amplifier. The bias current can be used to provide a representation of the power level of the output of the power amplifier.

Figure 6:
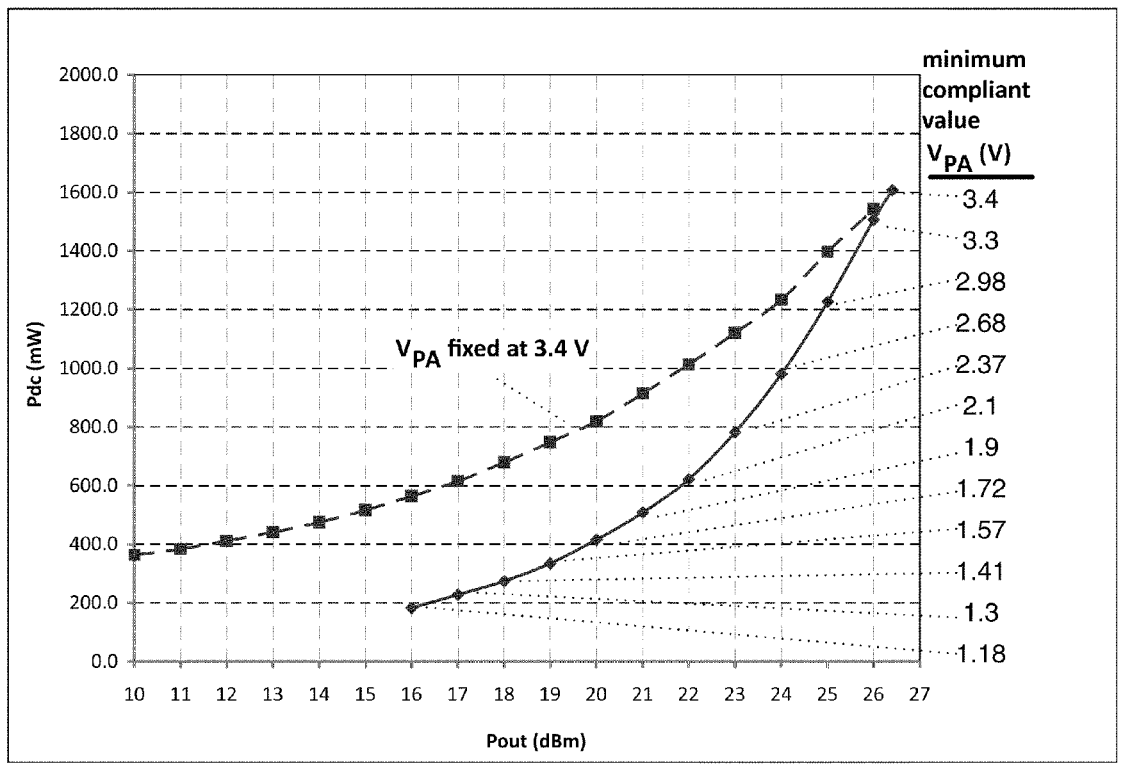
FIG. 6 is a plot showing representative data for DC power consumption using minimum compliant values of $V_{PA}$ versus output power, compared with using a constant supply voltage.

The threshold power value for a given supply voltage may be established through measurements of the characteristics of a given power amplifier. A representative data set for a commercial power amplifier is depicted in FIG. 6. For each required output power, the minimum value of supply voltage $V_{PA}$ that produces output compliant with the relevant application requirements is used. In many cases, linearity requirements (such as adjacent channel power, error vector magnitude, or harmonic content) will limit the minimum voltage that can be used, but other requirements may also be important. The threshold power may then be set equal to the power at which the available regulated voltage is sufficient to produce compliant output. For example, for the dataset of FIG. 6, if $V_{reg1}$=1.8 V, a threshold power between 20 and 21 dBm would be selected.

The performance benefits to be expected may be estimated by fitting a simple form for the DC current as a function of RF power to the measured data for a representative commercial handset power amplifier:

$$I_{cc, RF} = I_0 + g_m \frac{v_{rf, in} - v_{on}}{2}$$
$$v_{rf, in} > v_{on}$$

$$I_0 = 80 \text{ mA}; g_m = 2100 \text{ mS}; v_{on} = 0.03$$

where $I_0$ is the current in the absence of an RF input, $g_m$ the effective transconductance of the amplifier, $v_{on}$ is the equivalent input voltage corresponding to the nominal quiescent operating point, and $v_{rf}$ is the input RF voltage, estimated from the input power assuming a 50 ohm equivalent input resistance:

$$v_{rf, in} = \sqrt{2 R_{in} P_{in}} \approx \sqrt{100 \frac{10^{PdBm/10}}{1000}}$$

The DC power is then obtained as the product of the nominal bias voltage $V_{PA}$ and the applicable DC current $I_{cc,RF}$. The parameter values shown fit measured data for operation at 3.4 V, 1.8 V, and 1.2 V, at output power from 10 to 27 dBm, to better than 10% accuracy.

Figure 7:
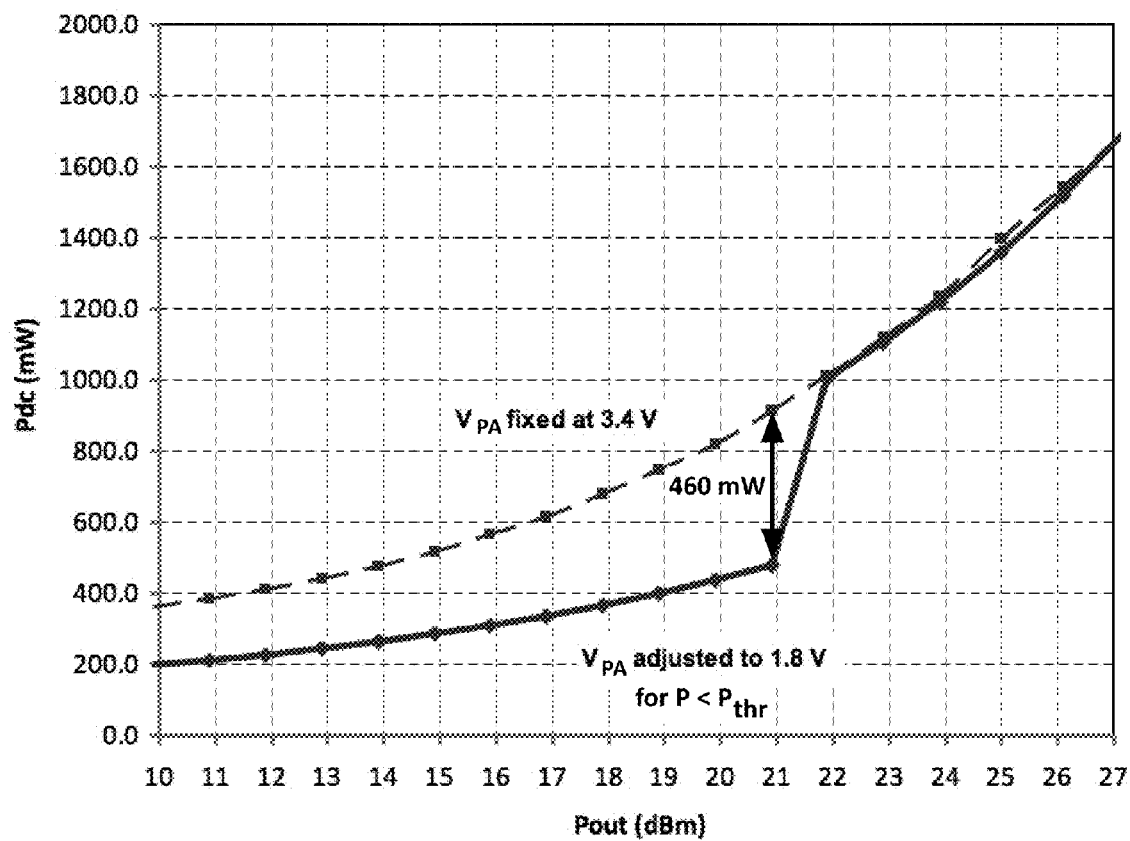
FIG. 7 is a plot showing an example of modeled performance for a commercial power amplifier using two supply voltage values.

Representative resulting performance data is depicted in FIG. 7. Near the threshold power, substantial absolute power savings, here approximately 460 mW, are obtained by reducing the supply voltage. At output power levels well below the threshold value, the advantage obtained by reducing the supply voltage is more modest but still significant. The net benefit in a specific application depends on the probability distribution function (that is, on the relative amount of time the power amplifier spends delivering a given amount of power).

Figure 8:
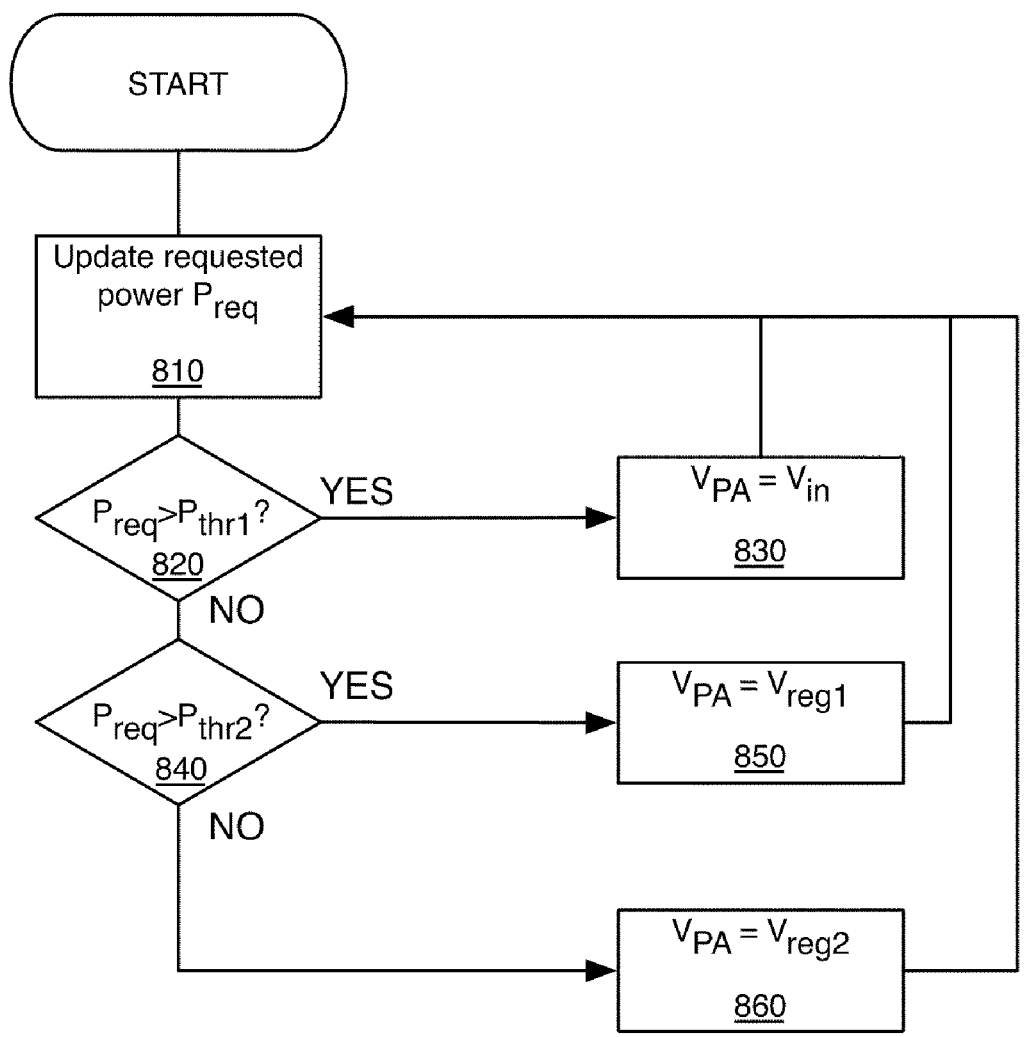
FIG. 8 is a flow chart that shows steps of an example of a method of determining a current state of a triple-throw switch of a multi-use voltage regulator.

Additional benefits can be obtained if more than one regulated voltage value is available, as depicted in FIG. 3. An appropriate control flow is depicted in FIG. 8. The first threshold power $P_{thr1}$ is determined as described above based on the first regulated voltage $V_{reg1}$. The second threshold power $P_{thr2}$ is found in the same fashion, using the second voltage value $V_{reg2}$. As shown in the flow chart of FIG. 8, the request power $P_{req}$ is updated (step 810). If $P_{req}$ is greater than a first threshold ($P_{thr1}$) (step 820), then the Power Amplifier supply voltage is set to $V_{in}$ (step 830). If $P_{req}$ is less than the first threshold ($P_{thr1}$), but is greater than a second threshold ($P_{thr2}$) (step 840), then the Power Amplifier supply voltage is set to $V_{reg1}$ (step 850). If $P_{req}$ is less than the first threshold ($P_{thr1}$) and less than the second threshold ($P_{thr2}$), then the Power Amplifier supply voltage is set to $V_{reg2}$ (step 860).

Figure 9:
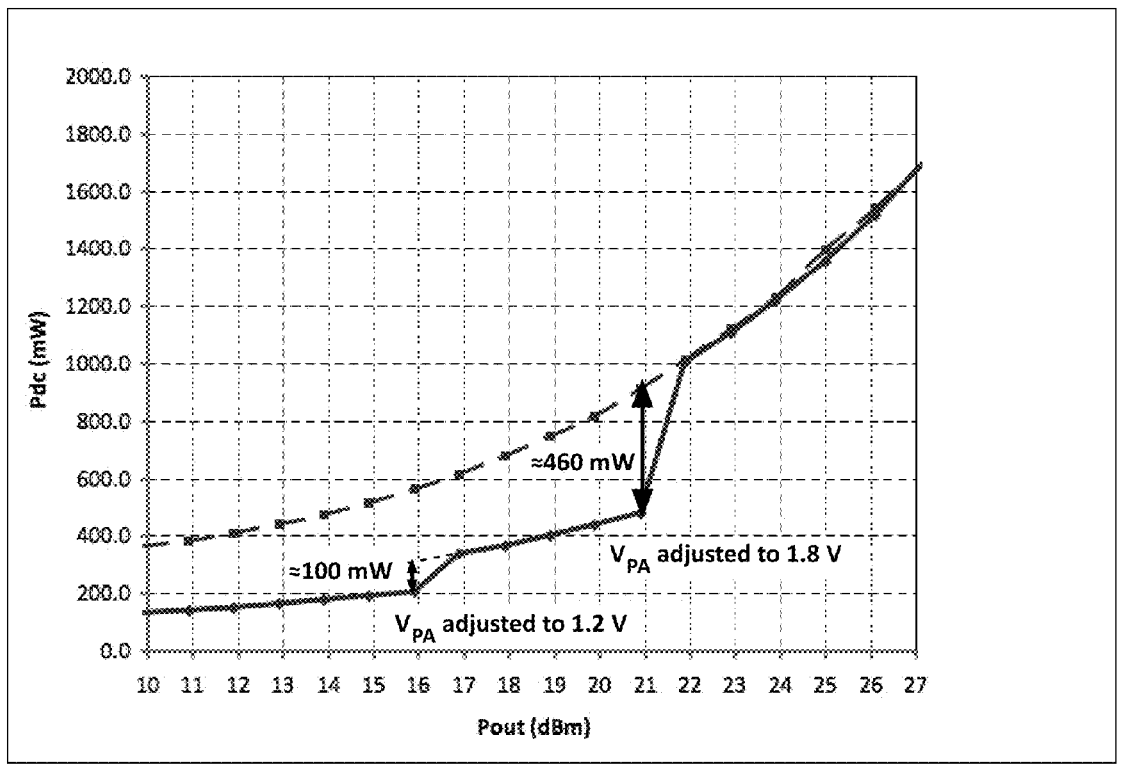
FIG. 9 is a plot showing an example of DC power consumption vs. required output power for the case where regulated voltages of 1.2 and 1.8 V are provided from an input voltage of 3.4 V.

Using the exemplary data of FIG. 6, and assuming that Vreg2=1.2 V, the second threshold power would be found to be between 16 and 17 dBm. Representative resulting power consumption is depicted in FIG. 9. A smaller but still substantial reduction in power consumption, relative to that when only 1.8 V is available, is found when the required power becomes less than the second threshold power.

The described embodiments can also be employed in conjunction with other power-saving mechanisms commonly available in power amplifiers. For example, many commercial amplifiers incorporate a low-power mode in which a smaller output device, or a segment or portion of the full-sized output transistor or transistors, are employed when reduced output power is required. The principle of power saving through supply voltage adaptation remains applicable in this case, although the threshold powers must be established separately for the low-power and high-power operating modes.

It is important to note that, in order to support operation in the envisioned manner, the High Efficiency Regulators such as 203, 303, and 304, must provide certain performance characteristics. When the switch 206 or 306 changes state, the load current drawn from one of the regulators will change fairly abruptly; for example, for the conditions shown in FIG. 7, the Power Amplifier dissipates about 500 mW from a 1.8 V source, thus drawing roughly 275 mA. When the switch 206 connects High Efficiency Regulator 203 to the Power Amplifier 207, the current drawn from Regulator 203 will increase by about 275 mA. Typical specifications for power supplies for digital circuitry require voltage variation of less than 3% of the nominal value, in the exemplary case 1.8 V±27 mV. For a 1.2 V nominal supply, the applicable variation is ±18 mV. Thus the regulator must be able to support substantial changes in current consumption with minimal voltage variation, and recover rapidly in response to changes in load. The consequent requirements are qualitatively similar to demands placed on the regulators to support power management in the digital and baseband circuitry, and do not necessarily represent a substantial barrier to implementation, but must be accounted for in component specification.

FIG. 10 is a block diagram that shows an example of multi-use voltage regulation within a mobile transceiver that includes a selection of multiple voltage supplies and an open switch setting for providing a switching time delay. The embodiment of the multi-use voltage regulator of FIG. 10 is similar to the multi-use voltage regulator of FIG. 2, but additionally includes a comparator 1008 and a triple-throw switch 1006 that includes a no-connection state. In the situation in which a lower potential voltage supply is selected for the power amplifier, the comparator 1008 provides a delay between connection of the power amplifier to the higher potential voltage supply to the connection with the lower potential voltage supply. That is, the comparator detects when the voltage potential of the power amplifier 207 decays to within a margin of the lower potential voltage supply. Once triggered, the output 1009 of the comparator can be coupled, for example, to the digital baseband 208, which can in turn, control the settings of the triple-throw switch 1006. As will be shown and described in FIG. 11, once a lower voltage supply potential for the power amplifier 207 is selected, the triple-throw switch 1006 can be switched from a previously selected voltage supply (such as, the non-regulated voltage supply) to a no-connection setting. Once the comparator 1008 detects that the voltage potential of the power supply of the power amplifier decays to within a margin of the voltage potential of the newly selected voltage supply, the output 1009 drives (through the digital baseband 208 as shown) the triple-throw switch 1006 to connect the newly selected voltage supply to the power amplifier 207.

FIG. 11 is a flow chart that shows steps of an example of a method of determining a current state of a triple-throw switch of a multi-use voltage regulator that includes a switching time delay. As shown in the flow chart of FIG. 11, the request power $P_{req}$ is updated (step 1110). If $P_{req}$ is greater than a threshold ($P_{thr}$) (step 1120), then the Power Amplifier supply voltage is set to $V_{in}$ (step 1130). If $P_{req}$ is less than the threshold ($P_{thr}$), then the switch (for example, switch 1006 of FIG. 10) is set to a no-connection setting. Upon, for example, a comparator detecting that the voltage potential of the Power Amplifier supply voltage has decayed to within the margin of the newly selected supply voltage (Vreg1) (step 1150), then the switch is set to connect the newly selected voltage potential Vreg1 to the power amplifier (step 1160).

While FIG. 10 and FIG. 11 show and describe a comparator that determines the switch time delay. It is to be understood that other equivalent methods can be used for setting the switch time delay. For example, the switch time delay could be calculated or estimated based a value of a decoupling capacitor and a value of a load current of the power amplifier.

Although specific embodiments have been described and illustrated, the embodiments are not to be limited to the specific forms or arrangements of parts so described and illustrated.

What is claimed:

1. A method of a multi-use voltage regulator providing a supply voltage to a power amplifier and at least one other device comprising:
   generating a plurality of regulated voltage supplies from an unregulated voltage;
   determining an output signal power level of the power amplifier;
   selecting a one of the regulated plurality of voltage supplies and the unregulated voltage supply as a power amplifier voltage supply for the power amplifier based at least in part on the output signal power level of the power amplifier;
   wherein if the selected power amplifier voltage supply is one of the plurality of regulated voltage supplies, then simultaneously providing the selected one of the plurality of regulated voltage supplies to the power amplifier and the at least one other device; and
   further comprising selecting the power amplifier voltage supply at a rate at least as great as a rate in which the determined output signal power level changes more than a threshold.

2. The method of claim 1, further comprising reselecting the power amplifier voltage supply each time the determined output signal power level crosses a predetermined threshold.

3. A method of a multi-use voltage regulator providing a supply voltage to a power amplifier and at least one other device, comprising:
- generating a plurality of regulated voltage supplies from an unregulated Voltage;
- determining an output signal power level of the power amplifier;
- selecting a one of the regulated plurality of voltage supplies and the unregulated voltage supply as a power amplifier voltage supply for the power amplifier based at least in part on the output signal power level of the power amplifier;
- wherein if the selected power amplifier voltage supply is one of the plurality of regulated voltage supplies, then simultaneously providing the selected one of the plurality of regulated voltage supplies to the power amplifier and the at least one other device; and
- wherein at least one of the plurality of regulated voltage supplies comprises a switching regulator, wherein a switching frequency of the switching regulator is selected to avoid generation of interfering signals within a pass-band of the power amplifier and associated transmit band filter.

4. A method of a multi-use voltage regulator providing a supply voltage to a power amplifier and at least one other device, comprising:
- generating a plurality of regulated voltage supplies from an unregulated voltage;
- determining an output signal power level of the power amplifier;
- selecting a one of the regulated plurality of voltage supplies and the unregulated voltage supply as a power amplifier voltage supply for the power amplifier based at least in part on the output signal power level of the power amplifier;
- wherein if the selected power amplifier voltage supply is one of the plurality of regulated voltage supplies, then simultaneously providing the selected one of the plurality of regulated voltage supplies to the power amplifier and the at least one other device; and
- wherein at least one of the plurality regulated voltage supplies comprises a switching regulator, wherein the power amplifier amplifies transmission signals of a transmit channel of a transceiver, and wherein a switching frequency of the switching regulator is selected to avoid generation of interfering signals within a paired receive channel.

5. A method of a multi-use voltage regulator providing a supply voltage to a power amplifier and at least one other device, comprising:
- generating a plurality of regulated voltage supplies from an unregulated voltage;
- determining an output signal power level of the power amplifier;
- selecting a one of the regulated plurality of voltage supplies and the unregulated voltage supply as a power amplifier voltage supply for the power amplifier based at least in part on the output signal power level of the power amplifier;
- wherein if the selected power amplifier voltage supply is one of the plurality of regulated voltage supplies, then simultaneously providing the selected one of the plurality of regulated voltage supplies to the power amplifier and the at least one other device; and
- wherein if a new voltage supply is selected that has a lower voltage potential than a previously selected voltage supply, then a switch time delay is determined, wherein the switch time delay influences how long it takes to switch from providing the power amplifier with the previously selected power supply to providing the power amplifier with the new voltage supply.

6. The method of claim 5, wherein the switch delay time is determined by a value of a decoupling capacitor and a value of a load current of the power amplifier.

7. The method of claim 5, wherein the switch delay time is determined by a comparator that senses when a supply voltage potential of the power amplifier decays to within a margin of a voltage potential of the new voltage supply.

8. A method of a multi-use voltage regulator providing a supply voltage to a power amplifier and at least one other device, comprising:
- generating a plurality of regulated voltage supplies from an unregulated voltage;
- determining an output signal power level of the power amplifier;
- selecting a one of the regulated plurality of voltage supplies and the unregulated voltage supply as a power amplifier voltage supply for the power amplifier based at least in part on the output signal power level of the power amplifier;
- wherein if the selected power amplifier voltage supply is one of the plurality of regulated voltage supplies, then simultaneously providing the selected one of the plurality of regulated voltage supplies to the power amplifier and the at least one other device; and
- wherein the power amplifier voltage supply is selected by referencing a predetermined look-up-table that provides the power supply selection based on the determined output signal power level.

9. The method of claim 8, wherein the look-up-table is predetermined by characterizing the power amplifier for efficiency with compliant linearity over possible output signal power levels.

10. The method of claim 8, wherein the look-up-table is selected from a plurality of possible look-up-tables.

11. The method of claim 10, further comprising selecting the look-up-table from the plurality of possible look-up-tables depending upon a type of communication signal being amplified by the power amplifier.

12. The method of claim 10, further comprising selecting the look-up-table from the plurality of possible look-up-tables depending upon operating conditions of the power amplifier.

13. A multi-use voltage regulator system comprising:
- at least one regulated power supply, wherein each regulated power supply receives an unregulated voltage and produces a regulated voltage;
- means for receiving a representation of an output signal power level of a power amplifier;
- means for selecting a power amplifier supply voltage from a one of the unregulated voltage and the at least one regulated voltage based on the representation of the output signal power level;
- wherein if the selected power amplifier voltage supply is one of the plurality of regulated voltage supplies, then means for simultaneously providing the selected one of the plurality of regulated voltage supplies to the power amplifier and a different device; and
- wherein at least one of the plurality regulated voltage supplies comprises a switching regulator, wherein a switching frequency of the switching regulator is selected to avoid generation of interfering signals within a pass-band of the power amplifier and associated transmit band filter.

14. A multi-use voltage regulator system comprising:
at least one regulated power supply, wherein each regulated power supply receives an unregulated voltage and produces a regulated voltage;
means for receiving a representation of an output signal power level of a power amplifier;
means for selecting a power amplifier supply voltage from a one of the unregulated voltage and the at least one regulated voltage based on the representation of the output signal power level;
wherein if the selected power amplifier voltage supply is one of the plurality of regulated voltage supplies, then means for simultaneously providing the selected one of the plurality of regulated voltage supplies to the power amplifier and a different device; and
wherein at least one of the plurality of regulated voltage supplies comprises a switching regulator, wherein the power amplifier amplifies transmission signals of a transmit channel of a transceiver, and wherein a switching frequency of the switching regulator is selected to avoid generation of interfering signals within a paired receive channel corresponding to the transmit channel.

15. A multi-use voltage regulator system comprising:
at least one regulated power supply, wherein each regulated power supply receives an unregulated voltage and produces a regulated voltage;
means for receiving a representation of an output signal power level of a power amplifier;
means for selecting a power amplifier supply voltage from a one of the unregulated voltage and the at least one regulated voltage based on the representation of the output signal power level;
wherein if the selected power amplifier voltage supply is one of the plurality of regulated voltage supplies, then means for simultaneously providing the selected one of the plurality of regulated voltage supplies to the power amplifier and a different device; and
wherein the power amplifier voltage supply is selected by referencing a predetermined look-up-table that provides the power supply selection based on the determined output signal power level.

16. The voltage regulator system of claim 15, wherein the look-up-table is predetermined by characterizing the power amplifier for efficiency with compliant linearity over possible output signal power levels.

17. The voltage regulator system of claim 15, wherein the look-up-table is selected from a plurality of possible look-up-tables.

18. The voltage regulator system of claim 15, further comprising selecting the look-up-table from the plurality of possible look-up-tables depending upon a type of communication signal being amplified by the power amplifier.

19. A method of controlling voltage supply distribution of a mobile transceiver, comprising:
generating at least one regulated voltage supply from an unregulated voltage supply, wherein the at least one regulated voltage supply powers a device of the mobile transceiver;
determining an output signal power level of a power amplifier of the mobile transceiver;
selecting a one of the at least one regulated voltage supply and the unregulated voltage supply as a power amplifier voltage supply for the power amplifier based at least in part on the output signal power level of the power amplifier;
wherein if the selected power amplifier voltage supply is one of the plurality of regulated voltage supplies, then simultaneously providing the selected one of the plurality of regulated voltage supplies to the power amplifier and the device; and
wherein at least one of the plurality of regulated voltage supplies comprises a switching regulator, wherein a switching frequency of the switching regulator is selected to avoid generation of interfering signals within a pass-band of the power amplifier and associated transmit band filter.

20. , A method of controlling voltage supply distribution of a mobile transceiver, comprising:
generating at least one regulated voltage supply from an unregulated voltage supply, wherein the at least one regulated voltage supply powers a device of the mobile transceiver;
determining an output signal power level of a power amplifier of the mobile transceiver;
selecting a one of the at least regulated voltage supply and the unregulated voltage supply as a power amplifier voltage supply for the power amplifier based at least in part on the output signal power level of the power amplifier;
wherein if the selected power amplifier voltage supply is one of the plurality of regulated voltage supplies, then simultaneously providing the selected one of the plurality of regulated voltage supplies to the power amplifier and the device; and
wherein at least one of the plurality of regulated voltage supplies comprises a switching regulator, wherein the power amplifier amplifies transmission signals of a transmit channel of the mobile transceiver, and wherein a switching frequency of the switching regulator is selected to avoid generation of interference within a paired receive channel of the mobile transceiver.

* * * * *